UNITED STATES PATENT OFFICE.

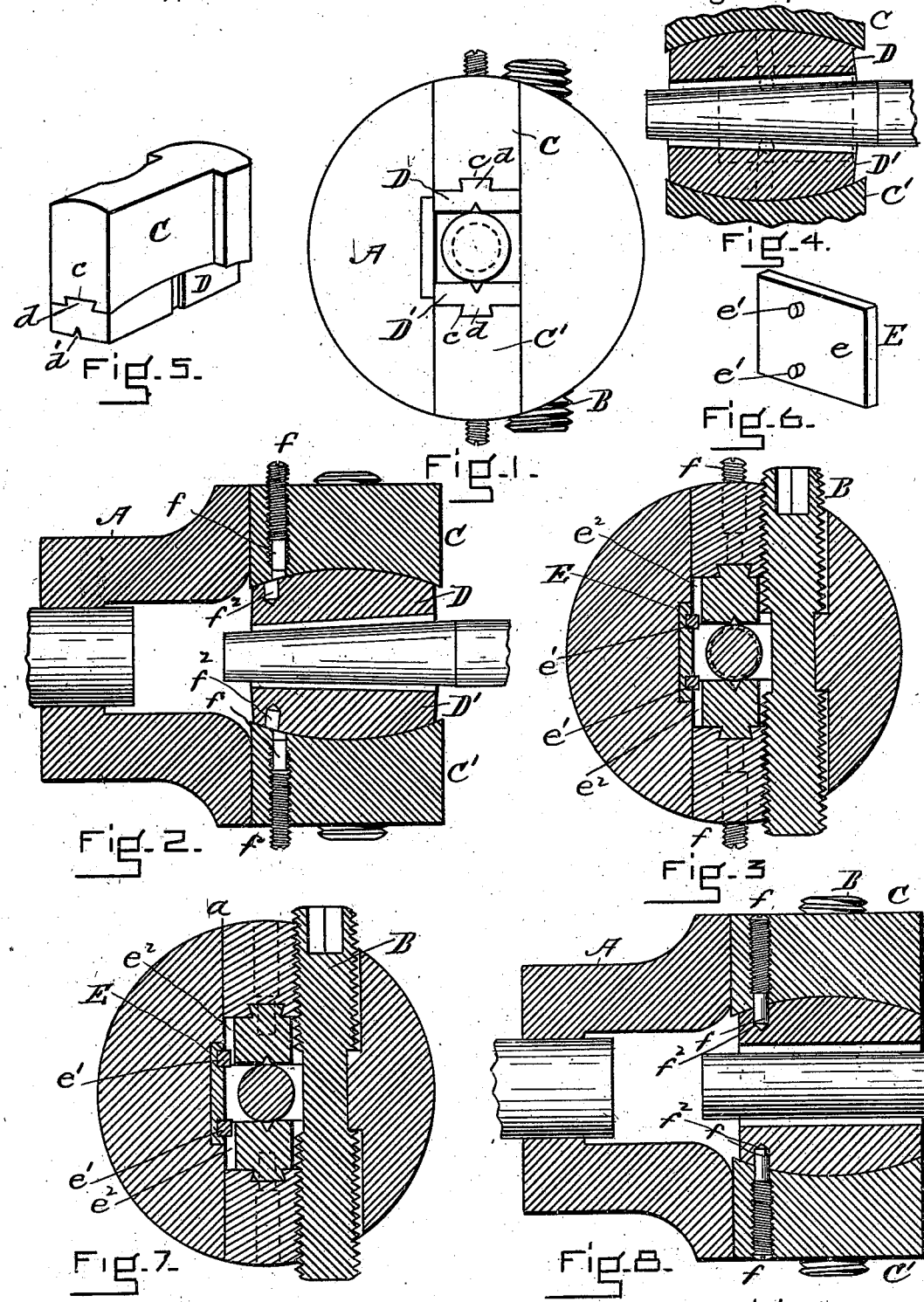

ROBERT L. STANLEY, OF SOMERVILLE, ASSIGNOR OF ONE-HALF TO FRANK E. WHITNEY, OF MELROSE, MASSACHUSETTS.

CHUCK FOR LATHES.

SPECIFICATION forming part of Letters Patent No. 504,285, dated August 29, 1893.

Application filed May 20, 1893. Serial No. 474,987. (No model.)

*To all whom it may concern:*

Be it known that I, ROBERT L. STANLEY, a citizen of the United States, residing at Somerville, in the county of Middlesex, in the State of Massachusetts, have invented a new and useful Improvement in Chucks for Lathes and other Uses, of which the following is a full, clear, and exact description, reference being had to the accompanying drawings, forming a part of this specification, in explaining its nature.

The object of my invention is to provide a chuck the jaws of which shall be automatically comformable to a tapering surface so that a stud, tool shank or anything else having a tapering surface or end may be entered between the jaws of the chuck and the jaws made to conform to the taper and grasp the tapering end by being simply moved against it and without requiring any other manipulation. This result is obtained by mounting in slides having opening and closing movements in relation to each other and carried by the stock of the chuck jaws attached to the slides, so that their inclination or angle may be varied by movement in relation thereto, and which are connected with each other in a manner to cause the movement of one from a straight position to communicate a similar movement, but in an opposite direction to the other.

The invention further relates to various details of construction, all of which will hereinafter be fully described.

In the drawings: Figure 1. is a view in end elevation of a chuck having the features of my invention. Fig. 2. is a view in vertical central section thereon. Fig. 3. is a view in cross section thereof. Fig. 4. is a detail view to illustrate the connection between the two conformable jaws. Fig. 5. is a view in perspective of one jaw and slide removed from a chuck. Fig. 6. is a view in perspective of a jaw governing plate to which reference is hereinafter made. Figs. 7 and 8. illustrate features of construction especially devised for locking the jaws and the slides.

A is the stock of the chuck, across it extends a T-recess $a$ in which there is arranged to be moved toward and from each other by the right and left screw B the T-slides C C', each of the slides having a sectional thread upon the face adjacent to the right and left screw with which the thread of the screw engages. The inner face of each of these slides C C' is formed upon the arc of a circle, and there is also formed in such grooved face a dove-tailed slot $c$, and there is arranged to fit this grooved face of each slide and slide on it a jaw, the two jaws being lettered D D', and each jaw has a longitudinal dove-tail tongue $d$ which enters the dove-tail recess $c$ and serves to hold the jaw to the face of the slide.

It will be readily seen that by the longitudinal movement of the jaw upon the slide the angle of its biting or straight surface $d'$ is varied and that when closed upon a tapering surface it will automatically conform to the inclination or taper of such surface. It is desirable, however, that both jaws should be simultaneously moved to the same degree of inclination or so as to bring the biting or clamping face at the same angle in relation to a common base, and to accomplish this the jaws are connected with each other, so that the inclination of one governs or controls the inclination of the other, but in the reverse direction. One way of reaching this result is represented in Figs. 3 6 and 7 where the stock A has a recess E in the wall of the recess $a$ opposite the screw, and in its recess is a slide plate $e$ which has upon each side a pin $e'$, and each of these pins enters a groove $e^2$ in the side of the jaw D D' respectively. These grooves if the jaws are straight do not, upon their movement in or out, change the position of the slide plate, but if either of the jaws is inclined it immediately causes the plate to be lifted or lowered in the recess, and in so doing lifts or lowers its opposite jaw to a similar extent, and the relative height and position of the two jaws in relation to each other are thus maintained, one governing the position and inclination of the other.

I would say that I do not confine myself to the particular means herein specified for providing the jaws with the adjustment herein specified, whereby they automatically conform to an inclined or tapering surface, but I may use any mechanical equivalent therefor.

In Figs. 2 and 8 I have represented each slide as having a screw $f$, the inner end $f'$ of which enters a hole $f^2$ in the jaw and serves when it is entered therein to lock the jaw, so that their biting surfaces shall be parallel, and so that they shall be rigidly held to the slide instead of being movable thereon. This locking device is used when it is desired to employ the chuck upon straight work.

Having thus fully described my invention, I claim and desire to secure by Letters Patent of the United States—

1. In a chuck for lathes and other tools, the stock having a cross recess, the slides C C' movable in said recess toward and from each other, the movable jaws D D' connected together by means whereby the movement of one to an inclined position causes the other to be correspondingly inclined to the same angle, but in the opposite direction, as and for the purposes described.

2. The combination of the stock A, the slides C C' the jaws D D' movable on said slides as specified and having recesses $e^2$ with the connecting slide plate E having the pins $e'$ to enter said recesses, as and for the purposes described.

3. The combination of the stock A, the slides C C', the jaws D D' automatically conformable to a tapering or inclined surface, and locks for rigidly securing the jaws to the sides with their faces parallel, substantially as and for the purposes described.

ROBERT L. STANLEY.

Witnesses:
F. F. RAYMOND, 2d,
J. M. DOLAN.